UNITED STATES PATENT OFFICE.

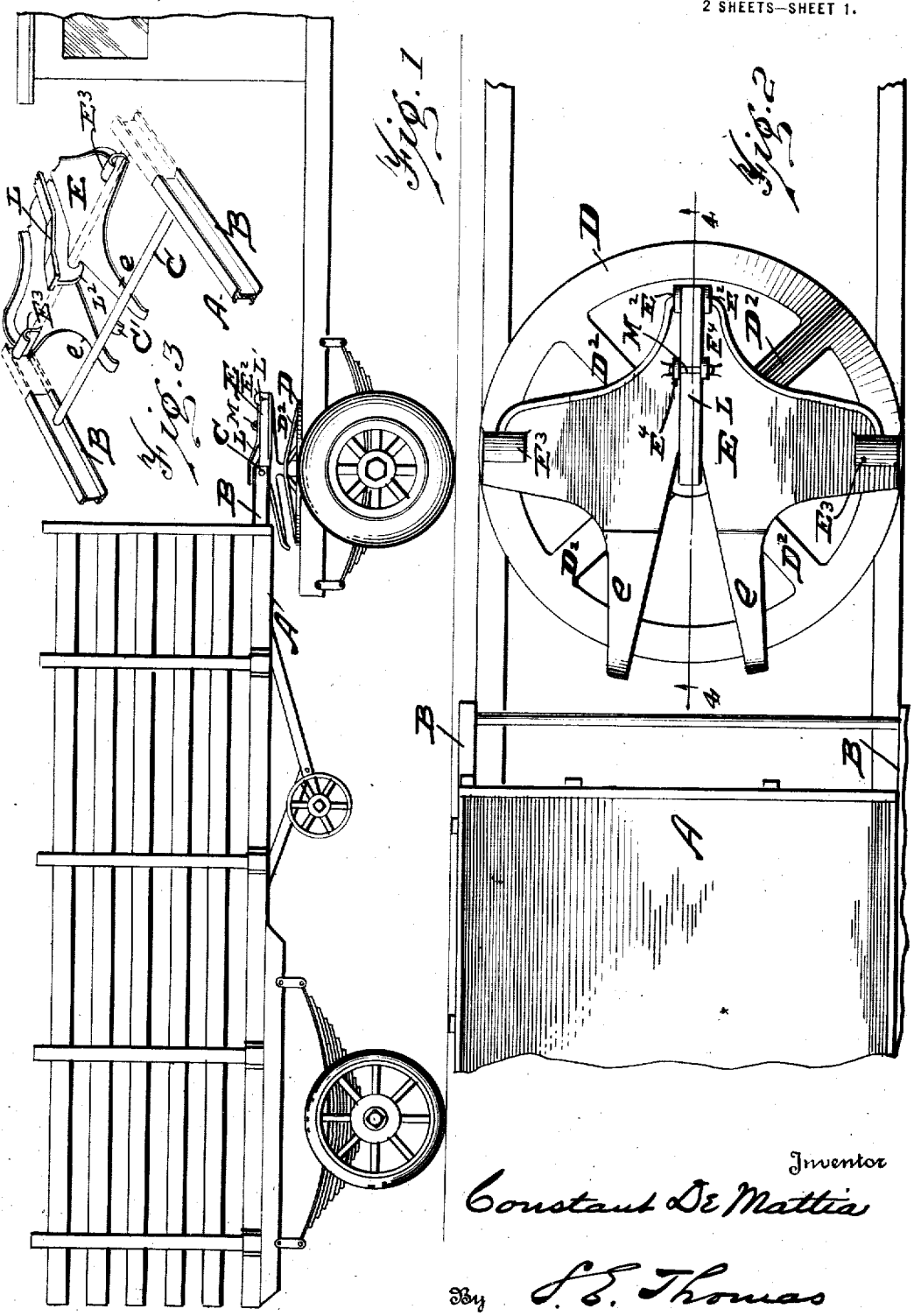

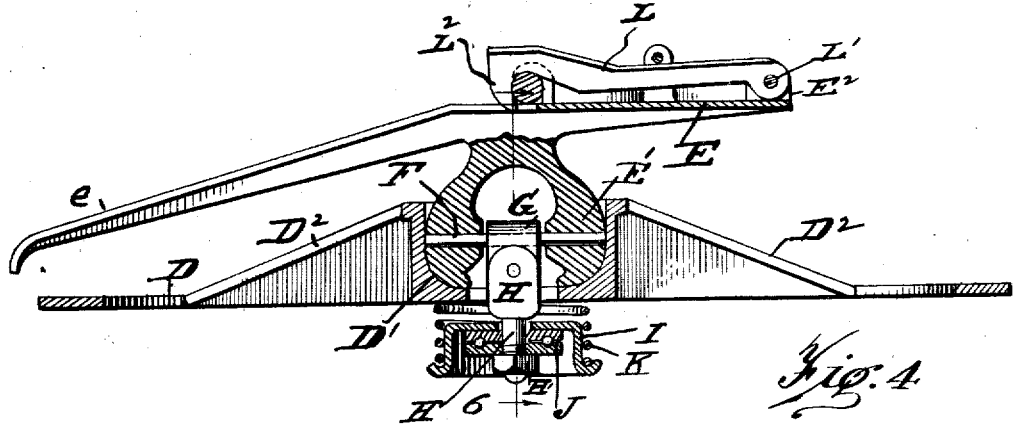
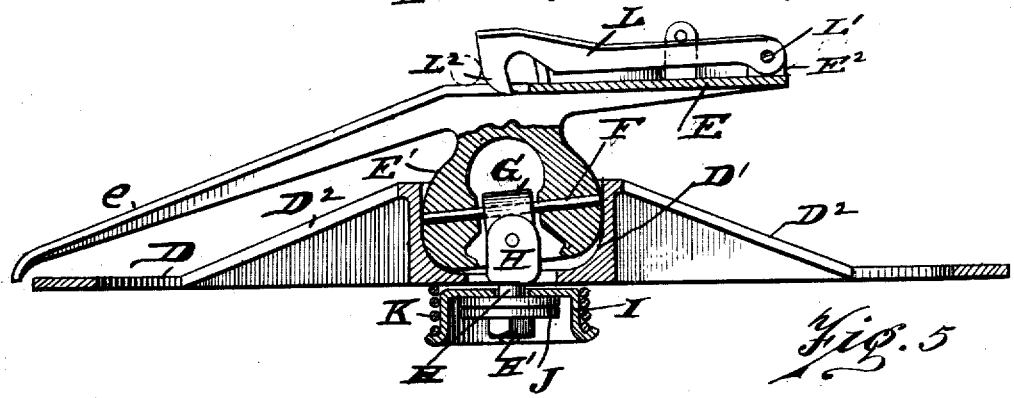
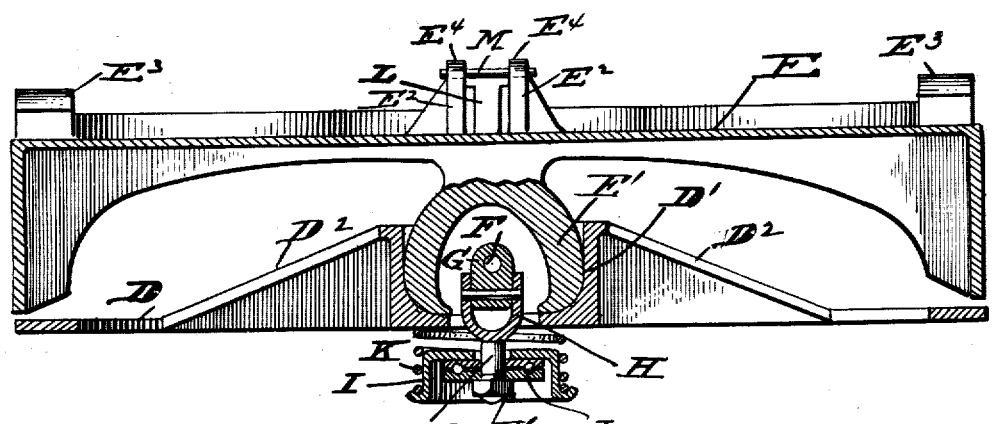

CONSTANT DE MATTIA, OF DETROIT, MICHIGAN, ASSIGNOR TO WOLVERINE TRUCK TRAILER CO., OF DETROIT, MICHIGAN, A CORPORATION OF MICHIGAN.

TRAILER ATTACHMENT FOR MOTOR-VEHICLES.

1,368,705.   Specification of Letters Patent.   Patented Feb. 15, 1921.

Application filed February 4, 1920. Serial No. 356,322.

*To all whom it may concern:*

Be it known that I, CONSTANT DE MATTIA, a citizen of the United States, residing at Detroit, county of Wayne, State of Michigan, have invented a certain new and useful Improvement in Trailer Attachments for Motor-Vehicles, and declare the following to be a full, clear, and exact description of the same, such as will enable others skilled in the art to which it pertains to make and use the same, reference being had to the accompanying drawings, which form a part of this specification.

My invention relates to a trailer attachment for vehicles, and particularly to means for automatically coupling a trailer to a tractor or other motor vehicle.

One object of the invention is to embody in connection with a fifth wheel mounted on the frame of the tractor, means adapted to guide a coöperating coupling element carried by the trailer into interlocking relation with the means carried by the fifth wheel.

Another object of the invention is to provide means whereby a tiltable platform and guiding element carried by the fifth wheel is adapted to flex sufficiently that it may readily adjust itself to receive the coöperating coupling element carried by the trailer, the construction being such that when the parts are in proper interlocking relation to each other the tiltable platform carried by the fifth wheel will automatically return to its normal horizontal position.

Another feature of the invention consists in means for securing the parts when interlocked, in order that the trailer may not become accidentally detached from the tractor.

Another feature of the invention consists in providing a flexible coupling means whereby in the event the tractor being backed toward the trailer at any angle, the coupling elements will still be enabled to interlock:—the tiltable table carried by the fifth wheel being adapted to turn or tilt to any required degree necessary to couple the tractor and trailer together.

Another feature of the invention is the spring which is adapted to act upon the tiltable platform to restore it to its normal horizontal position when the trailer and tractor are coupled together,—the spring also serves to "take up" or neutralize much of the stress and strain of starting the vehicles;—and the tiltable platform being adapted to rock in any direction serves to eliminate any undue strain upon the coupling members, caused by obstructions or other irregularities in the road surface.

Heretofore if the rear wheels of the trailer were lower than the rear wheels of the tractor it served to prevent the tractor from obtaining proper traction and as no provision was made for side play between the tractor and trailer, they were found lacking in flexibility.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the drawings accompanying this specification:—

Figure 1 is a side elevation of a trailer attached to the rear end of a tractor.

Fig. 2 is a plan view of the same.

Fig. 3 is a fragmentary perspective view showing the coupling element carried by the trailer as it is about to enter the coöperating element carried by the tractor, and in dotted lines the tractor and trailer coupled together.

Fig. 4 is a vertical cross-sectional view through the fifth wheel, on line 4—4 of Fig. 2, showing the coupling hook engaged with the transverse bar of the trailer.

Fig. 5 is a similar view showing the transverse bar of the trailer in dotted lines bearing against the coupling hook to cause the latter to lift that it may engage the transverse bar, as shown in Fig. 4.

Fig. 6 is a vertical cross-sectional view on line 6—6 of Fig. 4.

Referring now to the letters of reference shown on the drawings:—

A, denotes a trailer, B, B its side sills extending beyond the forward end of the body of the trailer. C, indicates a transverse bar, supported by the side sills, having a downwardly extending lug C'. D, denotes an annular rim or fifth wheel, secured to the rear end of the tractor frame, with a central socket or hub portion D' connected to the rim by inclined spokes, $D^2$. E, indicates a tiltable platform provided with a supporting standard having a relatively large flat base adapted when in its normally upright position to rest upon and conform to the flat bottom wall of the socket or hub D' of the fifth wheel. Projecting downwardly from the tiltable platform is a pair of inclined spreading tines e, e to receive and guide the lug C' of the transverse bar C when brought into coupling relation with the latter. F, indicates a pin extending transversely across the supporting base E' on which is loosely sleeved a fitting G. H, indicates a bolt having a yoke-shaped end pivoted to the fitting G.

I, denotes a cup-shaped fitting sleeved upon the bolt H, and J, is an annular ball-race supported by the bolt between the fitting I and a nut H' engaging the bolt.

K, indicates a spring having one end bearing against the hub D' of the fifth wheel and the other end against a projecting flange on the fitting I.

L, denotes a hook-shaped latch pivoted on a transverse pin L' between a pair of upstanding lugs E², E², formed integral with the platform E. The end of the latch L is tapered slightly as indicated at L², in order that when the tractor is backed toward the trailer for coupling therewith, the transverse bar C of the trailer may lift the latch that the latter may engage said bar as shown in Fig. 5.

E³, E³ are arc-shaped lugs spaced apart and integral with the platform E, against which the transverse bar G bears when engaged by the latch L. M, is a removable lock-pin supported by lugs E⁴, E⁴, projecting from the platform E, adapted to straddle and thereby lock the latch L when engaged with the transverse bar C.

Having now indicated the several parts by reference letters the construction and operation of the device will be readily understood.

To couple the tractor with the trailer, the tractor is backed toward the forward end of the trailer, whereupon the downwardly inclined tines e, e, of the tiltable platform E are caused to project beneath the transverse bar C;—the spreading tines e, e, receiving between them the lug C' of the transverse bar which rides upon the tines onto the main body portion of the tilting platform, which is then returned to its normal substantially horizontal position due to the combined action of the spring K and the weight of the load upon the platform.

It will now be apparent that while the platform E is adapted to tilt so as to accommodate itself to the position of the transverse bar C of the trailer in order that it may couple with the latter, the tilting action is limited by contact with the fifth wheel and as soon as the parts are in their proper interlocking relation or relative position to each other, the platform E will return to its normal horizontal position.

Having thus described my invention what I claim is:—

1. In a device of the character described, the combination with a tractor and a trailer, of a transverse coupling bar carried by the trailer, a fifth wheel member carried by the tractor, a tiltable platform mounted on the fifth wheel member, and a coupling hook pivoted on said platform to automatically engage and lock said transverse bar to the platform.

2. In a device of the character described, the combination with a tractor and a trailer, of a transverse coupling bar carried by the trailer, a fifth wheel member carried by the tractor, said bar having a projection and the platform having a guideway adapted to extend beneath the bar to direct the latter onto the platform, the platform being tiltable so as to receive the said bar and adapted to maintain a normal horizontal position when the transverse bar is seated upon the platform, and means for locking the bar on the platform.

3. In a device of the character described, the combination of a tractor and a trailer, of a coupling bar carried by the trailer, a fifth wheel member carried by the tractor, a tiltable platform mounted on the fifth wheel member, and means on said platform to engage and automatically detachably lock said bar to the platform.

4. In a device of the character described, the combination with a tractor and a trailer; of a transverse coupling bar carried by the trailer; a fifth wheel member carried by the tractor; a tiltable platform having an inclined guideway adapted to extend beneath the transverse bar of the trailer to direct the latter onto the tiltable platform, said platform having a substantially flat supporting base loosely mounted in the frame of the fifth wheel, said platform being adapted to tilt upon said fifth wheel to receive the transverse coupling bar and to return to its normal horizontal position when the transverse coupling bar is seated upon the platform; and a coupling hook pivoted to said platform, adapted to automatically engage said transverse bar, whereby the tractor and trailer may be coupled together.

5. In a device of the character described, the combination with a tractor and a trailer, the trailer having forwardly projecting side sills, of a transverse coupling bar carried by said side sills and having a projection intermediate its ends, a fifth wheel member carried by the tractor, a platform carried by the fifth wheel member and provided with an inclined forked guideway adapted to pass beneath said bar to receive the projection of the latter and to guide the coupling bar onto the platform, the fifth wheel member having a socket, the platform having a depending projection conforming substantially in shape to the socket and fitting in the latter to permit tilting of the platform, and a latch pivoted on the platform and having a hooked end adapted to be engaged by the bar, the latch being operable to effect an automatic locking connection between said bar and the platform.

6. In a device of the character described, the combination with a tractor and a trailer; of a transverse coupling bar carried by the trailer; a fifth wheel member carried by the tractor and having a socket; a platform having a substantially flat base loosely supported in the socket in the fifth wheel, whereby a substantially universal joint is provided between the platform and the fifth wheel member, said platform having an inclined guideway to direct the transverse coupling-bar of the trailer onto the platform; means carried by said platform to receive and secure said transverse coupling bar when lodged thereon, and resilient means adapted to assist in maintaining said platform in a normally horizontal position.

7. In a device of the character described, the combination with a tractor and a trailer, of a fifth wheel member secured to the frame of a tractor, a tiltable platform mounted upon the fifth wheel member and having a forked portion, a transverse coupling element carried by the frame of the trailer; the transverse coupling element having a projecting lug adapted to enter between the forked portions of the tiltable platform; resilient means for maintaining the tiltable platform in a substantially horizontal position, and means for engaging said transverse coupling element, whereby the trailer may be coupled with the tractor.

8. In a device of the character described, the combination with a tractor and a trailer, of a fifth wheel member secured to the tractor frame, having a central socket, a platform supported by a pedestal having a substantially flat base, adapted to rock in the socket of the fifth wheel member, said platform provided with a downwardly inclined forked-way, a transverse bar secured to the frame of the trailer having a tongue adapted to be guided by the inclined forked-way of the platform, means carried by the platform to automatically engage said transverse bar, and means adapted to yieldingly maintain said platform in a substantially horizontal position.

9. In a device of the character described, the combination with a tractor and a trailer, of a fifth wheel member secured to the tractor frame, provided with a central socket or hub having an opening for the passage of a bolt; a tiltable platform having a pedestal lodged in said socket of the fifth wheel member and an inclined forked portion extending downwardly from the platform proper to receive and guide a transverse member carried by the trailer; a fitting pivoted to said pedestal; a bolt pivoted to the fitting, an annular member carried by said bolt adapted to receive the thrust of a spring; a spring housed between the annular member and the socket wall of the fifth wheel member; a transverse member carried by the trailer, provided with a projecting lug adapted to enter the forked portion of the tiltable platform; a latch carried by the platform adapted to engage the transverse member, and means for locking said latch against accidental disengagement.

10. In a device of the character described, the combination with a tractor and a trailer; of a fifth wheel member secured to the tractor frame; a tiltable platform supported upon said fifth wheel member, its tilting action limited by the latter, having an inclined way leading to the platform, a latch bar pivoted to the platform; lugs integral with the platform and substantially in alinement with the engaging end of said latch; a coöperative coupling element secured to the trailer comprising a transverse bar adapted to be guided by the inclined way of the tiltable platform into abutting contact with said lugs and into coupling engagement by said latch, and means for yieldably maintaining said platform in a substantially horizontal position.

11. In a device of the character described, the combination of a tractor and a trailer, a fifth wheel member secured to the tractor and a platform having a tiltable connection with the fifth wheel member and provided with a V-shaped slot forming a guideway, means carried by the trailer including a device extending into said guideway and guided by said slot to position the trailer with respect to coupling relation of the trailer to the tractor, and a device to lock the tractor and trailer in coupling relation.

12. In a device of the character described, the combination of a tractor and a trailer, a fifth wheel member secured to the tractor, a platform having a tiltable connection with the fifth wheel member and provided with downwardly extending diverging tines forming a substantially V-shaped guide way, means carried by the trailer including a projecting element which projects into said guideway and which is guided by the latter to position the trailer with respect to the coupling relation with the tractor, and a device to lock the trailer and tractor in coupling relation.

13. In a device of the character described, the combination of a tractor and a trailer, a fifth wheel member secured to the tractor, a platform having a universal joint connection with the fifth wheel member and provided with a downwardly extending portion having a substantially V-shaped slot therein forming a guideway, means carried by the trailer including an element projecting into said guideway and guided by the sides of the latter so as to position the trailer with respect to coupling relation to the tractor, and a device to automatically lock the tractor and trailer in coupling relation.

14. In a device of the character described, the combination of a tractor and a trailer, a fifth wheel member secured to the tractor, a platform having a tiltable connection with the fifth wheel member and provided with downwardly diverging tines extending beyond the fifth wheel member and forming a substantially V-shaped guideway, means carried by the trailer including an element projecting therefrom and into said guideway and guided by the sides of the latter so as to position the trailer with respect to coupling relation with the tractor, and means to lock the tractor and trailer in coupling relation.

15. In a device of the character described, the combination of a tractor and a trailer, of a bar disposed in advance of the body of the trailer and transversely thereof, a fifth wheel member carried by the tractor, a tiltable platform mounted on the fifth wheel member, and a device on the platform to co-act with said bar to couple the tractor and trailer together, the bar acting as a hinge pin to permit the trailer to flex freely under the action of irregularities in the road surface.

In testimony whereof I sign this specification in the presence of two witnesses.

CONSTANT DE MATTIA.

Witnesses:
L. E. THOMAS,
B. A. CUTTING.